United States Patent [19]

Ward

[11] Patent Number: 4,738,767

[45] Date of Patent: Apr. 19, 1988

[54] MILD HYDROCRACKING WITH A CATALYST CONTAINING SILICA-ALUMINA

[75] Inventor: John W. Ward, Yorba Linda, Calif.

[73] Assignee: Union Oil Company of California, Los Angeles, Calif.

[21] Appl. No.: 870,658

[22] Filed: Jun. 2, 1986

Related U.S. Application Data

[63] Continuation of Ser. No. 712,706, Mar. 14, 1985, abandoned.

[51] Int. Cl.[4] ............................................. C10G 13/06
[52] U.S. Cl. .................................... 208/111; 208/112; 208/216 R; 208/254 H; 208/46
[58] Field of Search ................ 208/111, 112, 143, 15, 208/46, 216 R, 254 H, 251 H, 144

[56] References Cited

U.S. PATENT DOCUMENTS

| | | | |
|---|---|---|---|
| 3,726,790 | 4/1973 | Gallagher et al. | 208/111 |
| 4,061,563 | 12/1977 | Hilfman | 208/111 |
| 4,097,365 | 6/1978 | Ward | 208/111 |
| 4,238,316 | 12/1980 | Mooi et al. | 208/111 |
| 4,289,653 | 9/1981 | Jaffe | 502/255 |
| 4,419,271 | 12/1983 | Ward | 208/111 |
| 4,513,097 | 4/1985 | Angmorter et al. | 208/216 R |

Primary Examiner—Helen M. S. Sneed
Assistant Examiner—Chung K. Pak
Attorney, Agent, or Firm—Dean Sandford; Gregory F. Wirzbicki; Alan H. Thompson

[57] ABSTRACT

A catalyst consisting essentially of a nickel component, a molybdnemum component, a phosphorus component on a heterogeneous support containing alumina matrix is employed to mildly hydrocrack a hydrocarbon oil.

18 Claims, No Drawings

4,738,767

MILD HYDROCRACKING WITH A CATALYST CONTAINING SILICA-ALUMINA

This application is a continuation of application Ser. No. 712,706, filed Mar. 14, 1985, now abandoned.

BACKGROUND OF THE INVENTION

The invention relates to a process for mild hydrocracking hydrocarbon oils. More particularly, the invention relates to a catalytic process for increasing the yield of middle distillate products from vacuum gas oils and residuum hydrocarbon feedstocks.

In the refining of hydrocarbon oils, it is often desirable to subject the hydrocarbon oil to catalytic hydroprocessing. During hydroprocessing, particulate catalysts are utilized to promote reactions such as hydrocracking, hydrodesulfurization, hydrodenitrogenation, hydrodemetallization, and/or conversion of asphaltene compounds. One or more of such reactions may occur during hydroprocessing by contacting a particulate catalyst with a feedstock, such as a residual petroleum oil fraction or a vacuum gas oil, under conditions of elevated temperature and pressure and in the presence of hydrogen. For example, the sulfur components in the feedstock may be converted to hydrogen sulfide, nitrogen components to ammonia, asphaltenes to molecules having increased hydrogen to carbon (H-C) ratios, higher molecular weight hydrocarbons to lower molecular weight hydrocarbons and contaminant metal components to components capable of being deposited on the catalyst. Hydrocracking is typically employed in the conversion of higher molecular weight hydrocarbons to lower molecular weight hydrocarbons to convert portions of a feedstock to lighter middle distillate products, such as gasoline and diesel oils.

Refiners of hydrocarbon oils are continually challenged to convert a greater portion of the oil into lighter middle distillate products. A number of conventional conversion processes are commonly used to tackle the conversion problem. Such processes include fluid catalytic cracking, hydrocracking and coking, which all require high capital investments in the refineries, and their construction may take years to be accomplished. Because of such high costs, refiners are continually searching for conversion processes which may be utilized in existing refinery units. One such alternative process for increasing a refinery's capacity to convert feedstocks to middle distillate products is "mild hydrocracking" in existing refinery units. Such a process involves more severely hydroprocessing a feedstock to obtain increased percentages of middle distillate products while operating within the constraints of the existing refinery equipment. One of the challenges to the refiner is to discover a catalyst which will suitably perform within the design limits of the existing hydroprocessing unit. For example, a mild hydrocracking catalyst utilized in a unit formerly used for vacuum gas oil desulfurization or residuum hydrodesulfurization (i.e. a unit formerly used for less than about 10 volume percent hydrocarbon conversion) must exhibit acceptable activity, selectivity and stability, under the limiting operating conditions of the existing unit.

Therefore, an aim of the art is to provide a mild hydrocracking catalyst having a high activity, selectivity and stability. Activity may be determined by comparing the temperature at which various catalyst must be utilized under otherwise constant mild hydrocracking conditions with the same feedstock so as to produce a given percentage (between 10 volume percent and 50 volume percent) of products boiling at or below 700° F. The lower activity temperature for a given catalyst, the more active such a catalyst is in relation to a catalyst of higher activity temperature. Alternatively, activity may be determined by comparing the percentages of products boiling at or below 700° F. when various catalysts are utilized under otherwise constant mild hydrocracking conditions with the same feedstock. The higher the percentage of 700° F.—minus product converted from the components in the feedstock boiling above 700° F. for a given catalyst, the more active such a catalyst is in relation to a catalyst yielding a lower percentage of 700° F.—minus product. Selectivity of a mild hydrocracking catalyst may be determined during the foregoing described activity test and is measured as that percentage fraction of the 700° F.—product boiling in the range of middle distillate or midbarrel products, i.e., 300° F.-700° F. Stability is a measure of how well a catalyst maintains its activity over an extended period when treating a given hydrocarbon feedstock under the conditions of the activity test. Stability is generally measured in terms of the change in temperature required per day to maintain a 40 volume percent or other given conversion (less than 50 volume percent).

A typical mild hydrocracking catalyst contains hydrogenation metals on a porous refractory oxide support. Hydrogenation metals usually include Group VIB and/or Group VIII active metal components supported on an amorphous refractory oxide suport such as alumina. The catalyst may also contain one or more acidifying components. Despite the high mild hydrocracking activity of the catalysts of the prior art, catalysts of yet higher activity, selectivity, and stability are still being sought.

Accordingly, it is a major object of this invention to provide a mild hydrocracking process utilizing an active and stable catalyst, and more particularly to provide a mild hydrocracking process utilizing such a catalyst in existing refinery units to convert about 10 to about 50 volume percent of a hydrocarbon oil boiling above 700° F. to middle distillate oils boiling at or below 700° F.

Another object of the invention is to provide a process for removing organonitrogen and/or organosulfur compounds from a residuum hydrocarbon oil or vacuum gas oil by contracting the oil with a catalyst having a support containing silica-alumina dispersed in an alumina matrix and simultaneously converting about 10 to about 50 volume percent of the oil boiling above 700° F. to middle distillate oils boiling at or below 700° F.

These and other objects and advantages of the invention will become apparent from the following description.

SUMMARY OF THE INVENTION

In U.S. Pat. No. 4,097,365, a hydrocracking process is taught using catalysts containing a molybdenum and/or tungsten component and a nickel and/or cobalt component on a support comprising a silica-alumina cogel or copolymer dispersed in finely divided form into an alumina matrix. This patent teaches that the "combination of tungsten and nickel is preferred, having been found to give higher activity at a given level of selectivity than does the molybdenum-nickel combination."

The present invention is founded on the surprising discovery that, for mild hydrocracking purposes, the very opposite is the case. That is to say, it has now been discovered that, in the specific instance of mild hydrocracking, the molybdenum-nickel combination has substantially greater activity at a given level of selectivity than the tungsten-nickel combination. Therefore, the present invention resides in a mild hydrocracking process employing a catalyst comprising a nickel component and a molybdenum component on a refractory oxide support comprising silica-alumina dispersed in a matrix of alumina. The mild hydrocracking process of the present invention yields about a 10 to about a 50 volume percent conversion of the hydrocarbon oil portion boiling above 700° F. to liquid products boiling at or below 700° F.

In one embodiment, the present invention provides a mild hydrocracking process promoted with a catalyst comprising a molybdenum first component plus a nickel second component supported on a heterogeneous support containing about 5 to about 75 weight percent of a finely divided cracking component dispersed in an alumina matrix wherein the cracking component is a silica-alumina cogel or copolymer containing about 20 to about 96 weight percent $SiO_2$. The mild hydrocracking conditions of the process are such as to yield about a 10 to about a 50 volume percent conversion of the hydrocarbon oil fraction boiling above 700° F. to liquid products boiling at or below 700° F. In another embodiment, the catalyst contains a phosphorus third component.

DETAILED DESCRIPTION OF THE INVENTION

The invention is directed to a mild hydrocracking process promoted by a catalyst comprising a molybdenum first component plus a nickel second component supported on a heterogeneous support containing about 5 to about 75 weight percent of a finely divided cracking component dispersed in an alumina matrix. The cracking component contains a silica-alumina cogel or copolymer containing about 50 to about 96 weight percent $SiO_2$. The process of the invention is particularly well suited for mild hydrocracking wherein a desired result is hydrocracking coupled with a suitable degree of hydrodenitrogenation and/or hydrodesulfurization of a hydrocarbon oil containing a relatively high content of nitrogen and sulfur.

Among the useful catalyst support materials for use in the present invention are those disclosed in U.S. Pat. No. 4,097,365, herein incorporated by reference in its entirety. However, in contrast to the teaching of the preferred combination of tungsten and nickel in U.S. Pat. No. 4,097,365, the catalyst employed in the present invention contains the combination of molybdenum and nickel metal components supported on the heterogeneous support material. In comparison to the nickel-tungsten catalyst, the nickel-molybdenum catalyst utilized in the mild hydrocracking process of the invention has been found to yield a higher activity (as measured by volume percent conversion) at three different temperature, i.e., 710° F., 735° F., and 755° F.

The heterogeneous alumina-silica catalyst supports utilized herein are composed of an alumina gel matrix (preferably a large pore alumina), in which a finely divided, intimately composited silica-alumina component is dispersed. Typically, these supports are prepared by comulling an alumina hydrogel with a homogeneous silica-alumina cogel in hydrous or dry form, or with a "graft copolymer" of silica and alumina, then extruding the homogenized mixture to provide extrudates of about 1/32 to about ⅛ inch cross-sectional diameter. Alternatively, to provide a more highly porous structure, the homogeneous mixture may first be spray dried, then remulled with added water and extruded. Silica-alumina cogel components are prepared by conventional coprecipitation methods, e.g., as described in U.S. Pat. No. 3,210,294. Silica-alumina graft copolymers are prepared in a known manner by impregnating silica hydrogel with an aluminum salt followed by precipitation of alumina gel with ammonium hydroxide in the pores of the silica hydrogel. The composition and principle physical characteristics of the dried and calcined support fall within the approximate ranges:

TABLE I

| | Broad Range | Preferred Range |
|---|---|---|
| Wt. % Cogel or Copolymer | 5–75 | 20–65 |
| Wt. % $SiO_2$ in Cogel or Copolymer | 20–96 | 50–90 |
| Overall $SiO_2$ Content of Support, Wt. % | 1–72 | 5–60 |
| Pore Volume, ml/g | 0.5–2.0 | 0.8–2.0 |
| Surface Area, $m^2/g$ | 150–700 | 300–600 |
| Av. Pore Diameter, Ang. | 50–150 | 70–130 |
| Percent of Pore Volume in Pores of Diameter Greater Than: | | |
| 100 Ang. | 10–80 | 25–70 |
| 500 Ang. | 5–60 | 20–50 |

While specific supports falling within the above composition ranges give catalysts differing considerably in activity, they share the common characteristic of contributing a higher activity at a given selectivity than would be obtained by using a homogeneous cogel of the same overall $SiO_2/Al_2O_3$ ratio.

In order to provide suitable mild hydrocracking activity, the heterogeneous support is composited with a minor proportion of a molybdenum component and a minor proportion of a nickel component. Suitable proportions of molybdenum range between about 5 and about 35, preferably about 10 and about 30 weight percent, calculated as $MoO_3$. Suitable proportions of the nickel component range between about 2 and about 15, preferably about 3 and about 10 weight percent, calculated as NiO. In addition to nickel and molybdenum components, it is highly preferred that suitable proportions of phosphorus be composited with the heterogeneous support. Suitable proportions of phosphorus range between about 0.5 and about 10, preferably about 1 and about 8 weight percent, calculated as P.

The active metals may be added to the support by any of the well known conventional methods providing a homogeneous and intimate dispersion thereof in the support. One or both of the active metal components may be incorporated into the wet support mixture during the mulling stage prior to extrusion. However, the metals are preferably added by impregnation with the aqueous salt solutions thereof, after drying and calcining of the support particles. Impregnation may be accomplished using a single mixed impregnation solution or the metals may be added singly in sequencial impregnations with intervening drying and/or calcining. Preferred nickel compounds for impregnation or comulling comprise the nitrates, acetates, formates, oxides, carbonates, and the like, and preferred molybdenum compounds include molybdenum oxide, ammonium molybdate, ammonium dimolybdate, or ammonium heptamolybdate. Preferred phosphorus compounds for impregnation or comulling comprise an acid of phosphorus, such as meta-phosphoric acid, pyrophosphoric acid, phosphorous acid, but preferably orthophosphoric acid, or a precursor, that is, a phosphorus-containing compound capable of forming a compound containing at least one acidic hydrogen atom when in the presence of water, such as phosphorus oxide, phosphorus, or the like. Following impregnation, the catalyst is dried and calcined in a conventional manner at elevated temperatures such as about 700° F. to about 1200° F. The catalyst is preferably sulfided prior to use, using, for example, mixtures of hydrogen and hydrogen sulfide.

The catalyst may be employed as either a fixed, slurried or fluidized bed (but most usually a fixed bed) of particulates in a suitable reactor vessel wherein a hydrocarbon oil to be treated is introduced and subjected to mild hydrocracking conditions including an elevated total pressure, temperature, and hydrogen partial pressure. Under such conditions, the hydrocarbon oil and catalyst are subjected to a hydrogen partial pressure usually less than 2,500 p.s.i.g. (frequently less than 1,200 p.s.i.g. for vacuum gas oil mild hydrocracking) at a space velocity usually less than 3.0 LHSV and often less than 1.0 LHSV, so as to effect the desired degree of hydrocracking, desulfurization, and denitrogenation. As used herein, mild hydrocracking conditions require the conversion of about 10 to about 50 and preferably 15 to about 35 volume percent of the feedstock hydrocarbons boiling above about 700° F. to products boiling at or below 700° F. from a single pass of a feedstock in contact with the catalyst. The selectivity of the catalyst is determined by the fraction of the 700° F.—minus product, which boils in the range from about 300° F. to about 700° F.

Contemplated for treatment by the process of the invention are hydrocarbon-containing oils, herein referred to generally as "hydrocarbon oils," including broadly all liquid and liquid/vapor hydrocarbon mixtures such as crude petroleum oils and synthetic crudes. Among the typical oils contemplated are top crudes, vacuum and atmospheric residual fractions, light and heavy atmospheric and vacuum distillate oils, shale oils, and oil from bituminous sands and coal compositions and the like. For use herein, typical hydrocarbon oils or mixtures thereof contain at least about 50 volume percent of components boiling above about 700° F. and/or a pour point usually greater than about 40° F.

Although virtually any hydrocarbon feedstock containing undesirable proportions of sulfur and nitrogen may be treated by mild hydrocracking, the process is particularly suited to treating (1) gas oils, perferably light and heavy vacuum gas oils and waxy shale oils, and (2) heavy residual fractions, especially the treated atmospheric and vacuum residuum oils containing less than about 25 ppmw of contaminant metals (vanadium, nickel, and the like). Sulfur is usually present in such oils in a proportion exceeding 0.1 weight percent and often exceeding 1 weight percent. Frequently, the feedstock contains undesirable proportions of nitrogen, usually in a concentration greater than about 0.01 weight percent and often between about 0.1 and 1.0 weight percent. The feedstock may contain waxy components, e.g., n-paraffins and isoparaffins, in amounts to exhibit pour points of at least about 30° F.

A hydroprocessing reactor useful in the mild hydrocracking process of the invention is ordinarily an existing reactor that is part of an existing hydroprocessing unit, or units, in a refinery. A preferred reactor is one formerly used for vacuum gas oil desulfurization. In the mild hydrocracking of such a gas oil, the catalyst is usually maintained as a fixed bed with the feedstock passing downwardly once therethrough, and the reactor is generally operated under conditions within the limits of the existing reactor design. In some instances, one or more additional mild hydrocracking reactors may be added to the existing equipment, either in series or parallel. Typical operating conditions that yield more than about a 10 volume percent conversion of the oil fraction boiling above 700° F. to liquid products boiling at or below 700° F. are shown in the following Table II.

TABLE II

| Operating Conditions | Suitable Range | Preferred Range |
|---|---|---|
| Temperature, °F. | 500–900 | 600–850 |
| Hydrogen Pressure, p.s.i.g. | 200–1,500 | 500–1,300 |
| Space Velocity, LHSV | 0.05–3.0 | 0.1–1.5 |
| Hydrogen Recycle Rate, scf/bbl | 500–15,000 | 1,000–10,000 |

Another preferred reactor utilized in the process of the invention is one formerly used for hydrodesulfurizing a hydrocarbon residuum feedstock. Ordinarily, this reactor is in the latter stage, or stages, of a multi-stage unit for hydrodesulfurization and/or demetallization of a residuum-containing feedstock. In the case of mild hydrocracking of a residuum feedstock, the total hydrogen pressure is usually higher than that during mild hydrocracking of a gas oil. In comparision to conventional hydrodesulfurization conditions that yield, from a single pass, less than about 10 volume percent of liquid hydrocarbon products boiling at or below 700° F., the operating conditions of the process of the invention for mild hydrocracking a residuum hydrocarbon typically include an increased temperature and/or decreased spaced velocity.

The results obtained in the mild hydrocracking process of the invention depend upon the nature of the feedstock and the severity of the operating conditions. It is preferred that about 15 to about 30 volume percent of the hydrocarbon oil be converted, in a single pass, to liquid products boiling at or below 700° F., and at least about 85 volume percent of the 700° F.—minus fraction contain liquid hydrocarbon products boiling in the midbarrel range from about 300° F. to about 700° F. In the case of hydrodewaxing, the pour point of the product is usually reduced to less than 30° F., and preferably less than 25° F.

The invention is further illustrated by the following examples which are illustrative of specific modes of practicing the invention and are not intended as limiting the scope of the invention defined by the appended claims.

EXAMPLE I

A catalyst, designated as catalyst A, is prepared in accordance with the invention.

Catalyst A is prepared as follows: A support containing overall 48 weight percent of silica and 52 weight percent of alumina is prepared by mulling about 55 parts by dry weight of an approximately 75/25 silica-alumina graft copolymer ($Al_2O_3$ precipitated via aluminum sulfate into the pores of a preformed silica gel) with 45 parts by weight of hydrous alumina gel, followed by spray drying. The spray dried composite is then remulled with water and extruded through a die producing 1/16 inch cross-sectioned clover-leaf extruded matter, which, after being broken into extrudates of 0.1 and 0.6 inch lengths, is oven dried at 110° C. for 2 hours and calcined at 1,200° F. for 2 hours.

The silica-alumina/alumina support particles are impregnated with a solution containing ammonium heptamolybdate, nickel nitrate, and phosphoric acid. After impregnation, the catalyst is dried at 110° C. and calcined at 900° F. in flowing air. A final catalyst is produced having a nominal composition as follows: 24.0 weight percent of molybdenum components, calculated as $MoO_3$, 4.0 weight, percent of nickel components, calculated as NiO, 5.0 weight percent of phosphorus components, calculated as P, with the balance comprising the silica-alumina/alumina support.

Catalyst A is tested under mild hydrocracking conditions to determine its hydrocracking activity and selectivity and its denitrogenation and desulfurization activity against two comparision catalysts in comparative processes.

Catalyst B is prepared in a similar manner as catalyst A, except the support particles are impregnated with an impregnated solution containing ammonium megatungstate and nickel nitrate. Catalyst B has a nominal composition of 22.0 weight percent of tungsten components, calculated as $WO_3$, 4.0 weight percent of nickel components, calculated as NiO and the same physical characteristics (including silica-alumina/alumina weight ratio) as catalyst A.

Catalyst C is a commercially available catalyst useful for mild hydrocracking and contains about 20.0 weight percent of molybdenum components, calculated as $MoO_3$, about 5.0 weight percent of cobalt components, calculated as CoO, about 3.0 weight percent of phosphorus components, calculated as P, and the balance of gamma alumina. Catalyst A and the two comparison catalysts are each presulfided for about 16 to about 20 hours by contact with a gas consisting of 90 volume percent $H_2$ and 10 volume percent $H_2S$ flowing at 4.4 SCFH (one atmosphere pressure). The temperature during the presulfiding is initially at room temperature, is increased gradually until 700° F. is reached, and then lowered to 550° F., at which time the catalyst is contacted with the feedstock.

Catalyst A and comparision catalysts B and C are tested at mild hydrocracking conditions to determine activity and selectivity with a Light Arabian vacuum gas oil (VGO) feedstock having the characteristics shown in Table III below. Table III also includes hydrodenitrogenation and hydrodesulfurization activity. The presulfided catalysts, A and the comparisons, are each charged in separate runs to a reactor and utilized at 710° F. for 3 days, at 735° F. for 2 days, and at 755° F. for the next 2 days to hydrocrack, hydrodesulfurize and hydrodenitrogenate the VGO feedstock under the following conditions: 1,000 p.s.i.g. total pressure, 1.0 LHSV and a hydrogen rate of 3,000 SCF/B.

TABLE III

| Feedstock Properties | |
|---|---|
| Feed Description | Light Arabian Vacuum Gas Oil |
| Gravity, °API | 22.3 |
| Sulfur, wt. % | 2.54 |
| Nitrogen, wt. % | 0.09 |
| Carbon Residue, D-189, wt. % | 0.42 |
| Pour Point, °F. | +95 |
| ASTM D-1160, Vol % | Distillation, °F. |
| IBP/5 | 623/700 |
| 10/20 | 737/776 |
| 30/40 | 810/837 |
| 50/60 | 860/898 |
| 70/80 | 928/968 |
| 90/95 | 1019/1056 |
| EP/% rec | 1103 |

A portion of the feedstock is passed downwardly through each reactor and contacted with the described catalysts in a single stage, single pass system with once-through hydrogen. The data relating to conversion of nitrogen and sulfur compounds and conversion to 700° F. minus products is summarized in Table IV.

TABLE IV

| Catalyst Temp, °F. | Product Vol % Boiling at or Below 700° F. | | | Wt. % Product S | | | Wt. % Product N | | |
|---|---|---|---|---|---|---|---|---|---|
| | 710 | 735 | 755 | 710 | 735 | 755 | 710 | 735 | 755 |
| A | 22.3 | 33.9 | 45.2 | .734 | .165 | .059 | .047 | .016 | .007 |
| B | 19.0 | 25.3 | 33.5 | .210 | .054 | .015 | .025 | .012 | — |
| C | 18.9 | 22.6 | 29.6 | .040 | .024 | .015 | — | .023 | .0113 |

In view of the data in Table IV relative to conversion of the feedstock to products boiling at a temperature at or below 700° F., the process of the invention utilizing catalyst A exhibits noticeably higher yields of products boiling below 700° F. than the comparison catalysts at all three conversion temperatures. Furthermore, the process utilizing catalyst A selectively produces essentially equivalent volume percentages of products boiling between about 300° F. and about 700° F. compared to a process devoid of a catalyst containing nickel and molybdenum components.

EXAMPLE II

Catalyst A of Example I is tested under mild hydrocracking conditions for 50 days to determine stability with the feedstock of Example I.

The presulfided catalyst is charged to a reactor and utilized under the following conditions: 1,100 p.s.i.g. total pressure, a space velosity of 0.89 LHSV, a hydrogen gas (90 percent purity) rate of 5250 SCF/B and a temperature sufficient to maintain conversion of 20 volume percent of the feedstock fraction boiling above 700° F. to 700° F.—minus product.

During the period from day 30 through the end of the run (day 50) the average temperature increase requirement (TIR) is 0.3° F. per day to maintain the 20 volume percent conversion. Such a TIR demonstrates good stability (i.e., resistance to deactivation) for the catalyst in the process of the invention.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A process for mild hydrocracking a hydrocarbon oil, said process comprising contacting said hydrocarbon oil under mild hydrocracking conditions of elevated temperature and pressure with a particulate catalyst consisting essentially of at least one nickel metal component, at least one molybdenum metal component and at least about one to about eight weight percent of a phosphorus component supported on a heterogeneous support consisting essentially of about 5 to about 75 weight percent of a finely divided cracking component dispersed in an alumina matrix, said cracking component being a copolymer containing about 20 to about 96 weight percent $SiO_2$, said mild hydrocracking conditions comprising a temperature and a hydrogen pressure in the range between about 200 p.s.i.g. and about 1,500 p.s.i.g. yielding about a 10 to about a 50 volume percent conversion of the hydrocarbon oil fraction boiling above 700° F. to hydrocarbon products boiling at or below 700° F.

2. The process defined in claim 1 wherein said hydrocarbon oil contains more than 50 volume percent of hydrocarbon components boiling above 700° F.

3. The process defined in claim 1 wherein said hydrocarbon oil is a residuum feedstock.

4. The process defined in claim 1 wherein said copolymer contains about 50 to about 90 weight percent $SiO_2$.

5. The process defined in claim 1 wherein said hydrocarbon oil contains sulfur and said process further comprises the simultaneous removal of said sulfur under said mild hydrocracking conditions.

6. The process defined in claim 1 wherein said hydrocarbon oil contains nitrogen and said process further comprises the simultaneous removal of said nitrogen under said mild hydrocracking conditions.

7. A process for mild hydrocracking a hydrocarbon oil, said process comprising contacting said hydrocarbon oil under mild hydrocracking conditions of elevated temperature and pressure with a particulate catalyst consisting essentially of at least one nickel metal component, at least one molybdenum metal component and at least about one to about eight weight percent of a phosphorus component supported on a heterogeneous support consisting essentially of about 5 to about 75 weight percent of a finely divided cracking component dispersed in an alumina matrix, said cracking component being a copolymer containing about 20 to about 96 weight percent $SiO_2$, said mild hydrocracking conditions comprise a hydrogen pressure in the range between about 500 p.s.i.g. and about 1,300 p.s.i.g. yielding about a 10 to about a 50 volume percent conversion of the hydrocarbon oil fraction boiling above 700° F. to hydrocarbon products boiling at or below 700° F.

8. The process defined in claim 7 wherein said hydrocarbon oil contains more than 50 volume percent of hydrocarbon components boiling above 700° F.

9. The process defined in claim 7 wherein said hydrocarbon oil is a residuum feedstock.

10. The process defined in claim 7 wherein said hydrocarbon oil is a vacuum gas oil.

11. The process defined in claim 7 wherein said hydrocarbon oil contains sulfur and said process further comprises the simultaneous removal of said sulfur under said mild hydrocracking conditions.

12. The process defined in claim 7 wherein said hydrocarbon oil contains nitrogen and said process further comprises the simultaneous removal of said nitrogen under said mild hydrocracking conditions.

13. A process for mild hydrocracking a hydrocarbon oil containing more than 50 volume percent of hydrocarbon components boiling at greater than 700° F., said process comprising contacting said hydrocarbon oil under mild hydrocracking conditions including a temperature greater than about 600° F., a hydrogen pressure from about 200 p.s.i.g. to about 1,500 p.s.i.g., and a space velocity less than about 1.5 LHSV with a catalytic composition consisting essentially of at least one nickel metal component, at least one molybdenum metal component and at least about one to about eight weight percent of a phosphorus component supported on a heterogeneous support consisting essentially of about 20 to about 65 weight percent of a finely divided cracking component dispersed in an alumina matrix, said cracking component being a copolymer containing about 50 to about 96 weight percent $SiO_2$, and said mild hydrocracking conditions yielding about a 15 to about a 35 volume percent conversion of said hydrocarbon oil boiling above 700° F. to hydrocarbon products boiling at or below 700° F.

14. The process defined in claim 13 wherein said catalytic composition consists essentially of about 5 to about 35 weight percent of molybdenum components, calculated as $MoO_3$, about 2 to about 15 weight percent of nickel components, calculated as NiO, and about 1 to about 8 weight percent of phosphorus components, calculated as P.

15. The process defined in claim 13 wherein said hydrocarbon oil is a residuum feedstock or a vacuum gas oil.

16. The process defined in claim 13 wherein said hydrocarbon products contain at least 85 volume percent of liquid hydrocarbon products boiling in the range from about 300° F. to about 700° F.

17. The process defined in claim 13 wherein said hydrocarbon oil contains sulfur and said process further comprises the simultaneous removal of said sulfur under said mild hydrocracking conditions.

18. The process defined in claim 13 wherein said hydrocarbon oil contains nitrogen and said process further comprises the simultaneous removal of said nitrogen under said mild hydrocracking conditions.

* * * * *